(12) United States Patent
Zibik et al.

(10) Patent No.: US 12,489,273 B2
(45) Date of Patent: Dec. 2, 2025

(54) VERTICAL CAVITY SURFACE EMITTING LASER (VCSEL) EMITTER WITH GUIDED-ANTIGUIDED WAVEGUIDE

(71) Applicant: II-VI Delaware, Inc., Wilmington, DE (US)

(72) Inventors: Evgeny Zibik, Zürich (CH); Antoine Pissis, Zürich (CH); Stefano Tirelli, Zürich (CH)

(73) Assignee: II-VI DELAWARE, INC., Wilmington, DE (US)

( * ) Notice: Subject to any disclaimer, the term of this patent is extended or adjusted under 35 U.S.C. 154(b) by 478 days.

(21) Appl. No.: 17/982,204

(22) Filed: Nov. 7, 2022

(65) Prior Publication Data

US 2024/0162685 A1 May 16, 2024

(51) Int. Cl.
*H01S 5/20* (2006.01)
*H01S 5/183* (2006.01)

(52) U.S. Cl.
CPC .......... *H01S 5/205* (2013.01); *H01S 5/18308* (2013.01); *H01S 5/18361* (2013.01); *H01S 2301/166* (2013.01)

(58) Field of Classification Search
CPC .... H01S 5/205; H01S 5/3095; H01S 5/18316; H01S 5/18308; H01S 5/18361; H01S 2301/166
See application file for complete search history.

(56) References Cited

U.S. PATENT DOCUMENTS

| | | | |
|---|---|---|---|
| 5,446,752 A * | 8/1995 | Ackley | H01S 5/18308 372/99 |
| 5,903,590 A * | 5/1999 | Hadley | H01S 5/18391 372/45.01 |
| 5,960,024 A * | 9/1999 | Li | H01S 5/423 372/96 |
| 6,901,099 B1 * | 5/2005 | Wasserbauer | H01S 5/18327 372/99 |
| 7,254,155 B1 | 8/2007 | Deng et al. | |
| 8,774,246 B1 | 7/2014 | Deppe et al. | |
| 10,230,215 B2 | 3/2019 | Graham et al. | |
| 10,374,391 B2 | 8/2019 | Graham et al. | |
| 10,992,110 B2 | 4/2021 | Tatum et al. | |

(Continued)

FOREIGN PATENT DOCUMENTS

| JP | 2004172341 | 6/2004 |
|---|---|---|
| JP | 2006351798 | 12/2006 |

(Continued)

OTHER PUBLICATIONS

Serkland et al., Two-element phased array of antiguided vertical-cavity lasers, Applied Physics Letters, vol. 75 No. 24 pp. 3754-3756 (Year: 1999).*

(Continued)

*Primary Examiner* — James A Menefee
(74) *Attorney, Agent, or Firm* — McAndrews, Held & Malloy, Ltd.

(57) ABSTRACT

A vertical cavity surface emitting laser (VCSEL) device comprising a VCSEL emitter having a waveguide with a guided portion and an antiguided portion is disclosed. The guided and antiguided portions may select and confine a mode of the VCSEL emitter. The antiguided portion may also be used to coherently couple adjacent VCSEL emitters.

18 Claims, 8 Drawing Sheets

(56) References Cited

U.S. PATENT DOCUMENTS

| | | | |
|---|---|---|---|
| 2002/0191656 A1* | 12/2002 | Mawst | H01S 5/423 372/50.123 |
| 2003/0185267 A1 | 10/2003 | Hwang et al. | |
| 2006/0249738 A1 | 11/2006 | Ortsiefer | |
| 2018/0233882 A1* | 8/2018 | Ledentsov | H01S 5/18311 |
| 2018/0366905 A1* | 12/2018 | Sirbu | H01S 5/2081 |
| 2020/0278426 A1* | 9/2020 | Dummer | H01S 5/0264 |
| 2021/0050711 A1 | 2/2021 | Shi et al. | |
| 2021/0098972 A1 | 4/2021 | Gazula et al. | |
| 2022/0209503 A1 | 6/2022 | Berk et al. | |

FOREIGN PATENT DOCUMENTS

| | | |
|---|---|---|
| JP | 2020064993 | 4/2020 |
| WO | 2018208274 | 11/2018 |

OTHER PUBLICATIONS

Botez et al., Phase-locked laser arrays revisited, IEEE Circuits and Devices, vol. 12 No. 6 pp. 25-32 (Year: 1996).*

"Coupling coefficient in antiguided coupling: magnitude and sign control", Zihe Gao, et al., Journal of the Optical Societe of America, vol. 35, No. 2, Feb. 2018, pp. 417-422.

"High-power single transverse and polarization mode VCSEL for silicon photonics integration", Erik Haglund, et al., Optics Express, vol. 27, No. 13, Jun. 21, 2109. (8 pages).

"Two-Element Phased Array of Monolithic Vertical-Cavity Lasers", Darwin K. Serkland, et al., IEEE Explore, downloaded Mar. 11, 2022. (2 pages).

"High-power single-mode vertical-cavity surface-emitting lasers using strain-controlled disorder-defined apertures", Patrick Su, et al., Applied Physics Letters, published Dec. 13, 2021. (6 pages).

Tobias Grundl et al., "Record Single-Mode, High-Power VCSELs by Inhibition of Spatial Hole Burning", IEEE Journal of Selected Topics in Quantum Electronics, vol. 19, No. 4, Jul. 1, 2013, 13 pages.

Czyszanowski Tomasz et al: "Comparison of spatial anti-guided mechanism in single emitter VCSELs and VCSEL arrays", Proceedings of SPIE, IEEE, US, vol. 9134, May 1, 2014 (May 1, 2014), 7 pages.

Huang Chia-Yen et al: "Challenges and Advancement of Blue III-Nitride Vertical-Cavity Surface-Emitting Lasers", Micromachines, vol. 12, No. 6, Jun. 9, 2021, 19 pages.

Choquette K D et al: "Leaky mode vertical cavity lasers using cavity resonance modification", Electronics Letters, the Institution of Engineering and Technology, GB, vol. 34, No. 10, May 14, 1998, 2 pages.

Jahan Nusrat et al: "Supermode Switching in Coherently-Coupled Vertical Cavity Surface Emitting Laser Diode Arrays", IEEE Journal of Selected Topics in Quantum Electronics, IEEE, USA, vol. 28, No. 1, Feb. 2022, 5 pages.

Zhou D et al: "Two-dimensional phase-locked antiguided verticalcavity surface-emitting laser arrays", Applied Physics Letters, American Institute of Physics, vol. 77, No. 15, Oct. 9, 2000, 3 pages.

European Search Report for Application No. 23172158, completed Mar. 28, 2024, 14 pages.

Japanese Office Action for Application No. 2023-089395, dated Jan. 26, 2024, 9 pages.

* cited by examiner

VERTICAL CAVITY SURFACE EMITTING LASER (VCSEL) EMITTER WITH GUIDED-ANTIGUIDED WAVEGUIDE

BACKGROUND

Lasers are commonly used in various applications such as data communications, 3D sensing, LIDAR, etc. and are a component of many modern devices. One use that has become more common is the use of lasers in data networks. Lasers are used in many fiber optic communication systems to transmit digital data on a network. In one exemplary configuration, a laser may be modulated by digital data to produce an optical signal, including periods of light and dark output that represents a binary data stream. In actual practice, the lasers output a high optical output representing binary highs and a lower power optical output representing binary lows. To obtain quick reaction time, the laser is constantly on, but varies from a high optical output to a lower optical output.

Optical networks have various advantages over other types of networks, such as copper wire based networks. For example, many existing copper wire networks operate at near maximum possible data transmission rates and at near maximum possible distances for copper wire technology. On the other hand, many existing optical networks exceed, both in data transmission rate and distance, the maximums that are possible for copper wire networks. That is, optical networks are able to reliably transmit data at higher rates over further distances than is possible with copper wire networks.

One type of laser that is used in optical data transmission is a Vertical Cavity Surface Emitting Laser (VCSEL) device. As its name implies, a VCSEL device has a laser cavity that is sandwiched between and defined by two mirror stacks. A VCSEL device is typically constructed on a semiconductor wafer such as Gallium Arsenide (GaAs). The VCSEL device includes a bottom mirror constructed on the semiconductor wafer. Typically, the bottom mirror includes a number of alternating high and low index of refraction layers. As light passes from a layer of one index of refraction to another, a portion of the light is reflected in phase. Such a mirror is commonly called a Distributed Bragg Reflector (DBR). By using a sufficient number of alternating layers, a high percentage ~99.9% of light may be reflected by the mirror. The top mirror may similarly be implement as a DBR, but with a lower reflectivity than the upper mirror (e.g., ~98%), such that light between the top and bottom mirrors may escape in a perpendicular direction from the top mirror. An electrically pumped active region comprising Quantum Wells (QWs) in inversion population may amplify the light reflected between the top and bottom mirrors, thus creating a coherent laser emission.

BRIEF SUMMARY OF THE DISCLOSURE

Shown in and/or described in connection with at least one of the figures, and set forth more completely in the claims are VCSEL devices and methods of forming such VCSEL devices.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
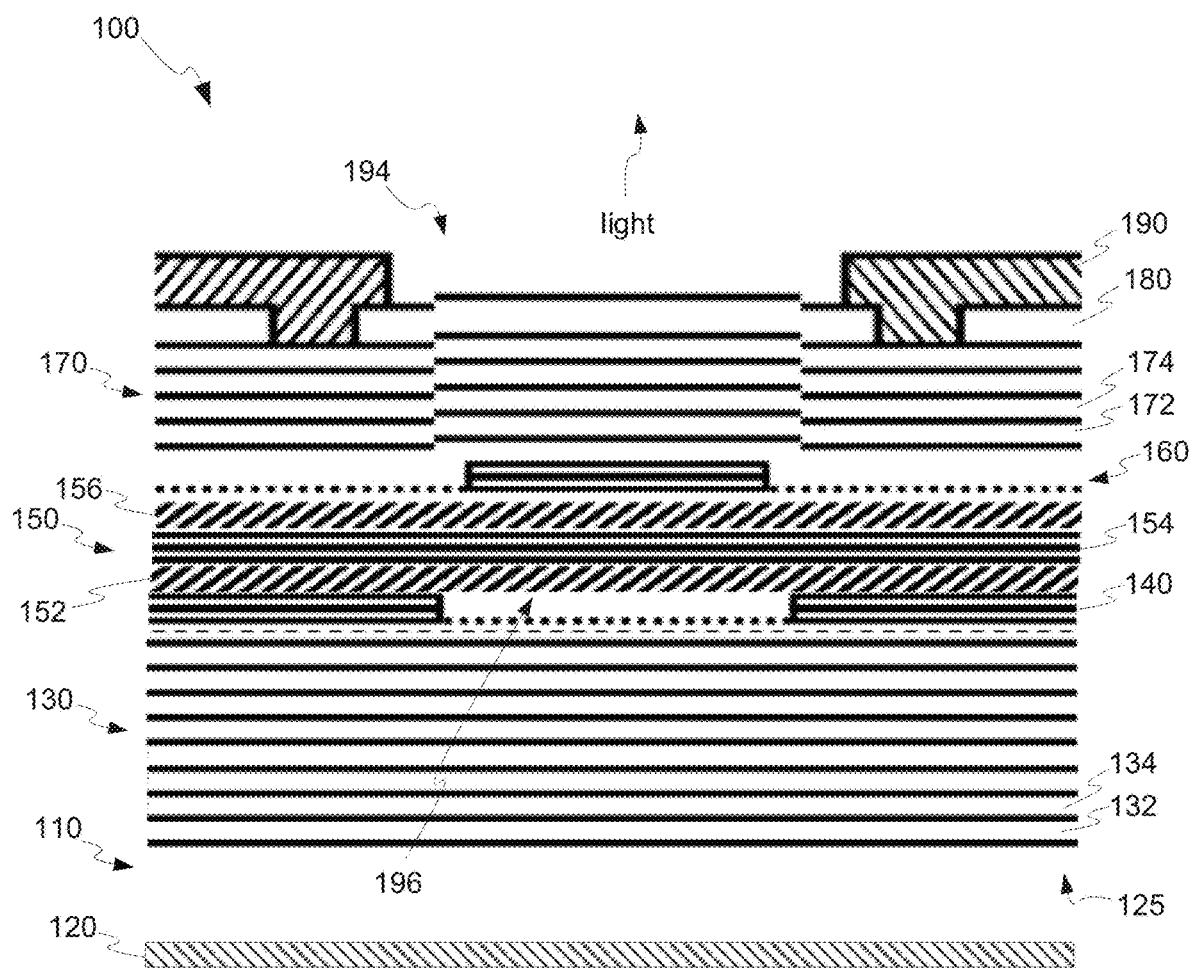
FIG. 1 provides a perspective view of a semiconductor device comprising a Vertical Cavity Surface Emitting Laser (VCSEL) device that includes a waveguide having guided and antiguided portions.

The following discussion provides various examples of VCSEL devices and methods of manufacturing VCSEL devices. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set {(x), (y), (x, y)}. As another example, "x, y, or z" means any element of the seven-element set {(x), (y), (z), (x, y), (x, z), (y, z), (x, y, z)}.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Generally, aspects of the present disclosure are directed toward vertical cavity emitting laser (VCSEL) devices comprising one or more VCSEL emitters with a vertical cavities that define waveguides with both guided portions and antiguided portions. In some embodiments, the VCSEL device may include a VCSEL emitter with guided portions and/or antiguided portions positioned between an upper mirror and an active region of the VCSEL emitter. Moreover, the VCSEL device may include a VCSEL emitter with guided portions and/or antiguided portions positioned between a lower mirror and the active region of the VCSEL emitter.

Referring now to FIG. 1, an example embodiment of a vertical cavity surface emitting laser (VCSEL) device 100 of a semiconductor device is shown. As shown, the VCSEL device 100 comprises a semiconductor substrate 110, a lower contact layer 120, a VCSEL emitter 125 on the semiconductor substrate 110, a passivation layer 180, and an upper contact layer 190. The substrate 110 may be doped with a first type of impurities (e.g., p-type or n-type dopant). The lower contact layer 120 may be in contact with a bottom side of the substrate 110.

The VCSEL emitter 125 may include a lower mirror 130, an antiguided portion 140, an active portion 150, a guided portion 160, and an upper mirror 170. The lower mirror 130 may be over the substrate 110 and the antiguided portion 140 may be over the lower mirror 130. In various embodiments, a bottom side of the lower mirror 130 may be in contact with a top side of the substrate 110 and a bottom side of the antiguided portion 140 may be in contact with a top side of the lower mirror 130.

As further shown, the active region 150 may be over the antiguided portion 140. As shown, the active region 150 may include a lower active layer 152, a tunnel junction layer 154, and an upper active layer 156. In various embodiments, a bottom side of the lower active layer 152 may be in contact with a top side of the antiguided portion 140, a bottom side of the tunnel junction layer 154 may be in contact with a top side of the lower active layer 152, and a bottom side of the upper active layer 156 may be in contact with a top side of the tunnel junction layer 154. The guided portion 160 may be over the active region 150. In various embodiments, a bottom side of the guided portion 160 may be in contact with a top side of the upper active layer 156 of the active region 150.

As further shown, the upper mirror 170 may be over the guided portion 160, the passivation layer 180 may be over the upper mirror 170, and the upper contact layer 190 may be over the passivation layer 180. In various embodiments, a bottom side of the upper mirror 170 may be in contact with the top side of the guided portion 160, the bottom side of the passivation layer 180 may be in contact with the top side of the upper mirror 170, and the bottom side of the upper contact layer 190 may be in contact with the top side of the passivation layer 180. Moreover, a bottom side of the upper contact layer 190 may pass through openings in the passivation layer 180 and contact the top side of the upper mirror 170. Further, the upper contact layer 190 may comprise an aperture 194 above a vertical cavity 196 of the VCSEL emitter 100, which permits passage of light from the vertical cavity 196 through the top side of the upper mirror 170.

The lower mirror 130 may comprise a distributed Bragg reflector (DBR) stack of alternating layers 132, 134. In various embodiments, the alternating layers 132, 134 may comprise alternating high and low index of refraction layers (e.g., alternating AlGaAs and AlAs layers). However, in other embodiments, the alternating layers 132, 134 of the lower mirror 130 may comprise other III-V semiconductor materials. The layers 132, 134 of the lower mirror 130 may be doped or undoped. Moreover, the doping may be n-type or p-type depending on the particular VCSEL design and the doping type of the substrate 110. However, other types of VCSEL mirrors may be used.

Similarly, the upper mirror 170 may comprise a distributed Bragg reflector (DBR) stack of alternating layers 172, 174. In various embodiments, the alternating layers 172, 174 may comprise alternating high and low index of refraction layers (e.g., alternating AlGaAs and AlAs layers). However, in other embodiments, the alternating layers 172, 174 of the upper mirror 170 may comprise other III-V semiconductor materials. The layers 172, 174 of the upper mirror 170 may be doped or undoped. Moreover, the doping may be n-type or p-type depending on the particular VCSEL design. However, other types of VCSEL mirrors may be used.

The lower contact layer 120 and upper contact layer 190 may comprise ohmic contacts that electrically bias the VCSEL emitter 125. When the VCSEL emitter 125 is forward biased with a voltage on upper contact layer 190 different than the one on lower contact layer 120, the active region 150 may emit light, which reflects between the upper mirror 170 and the lower mirror 130 and ultimately passes through upper mirror 170 and aperture 194 in the upper contact layer 190. Those skilled in the art will recognize that other configurations of contact layers 120, 190 may be used to generate a voltage across active region 150 and generate light.

Figure 2:
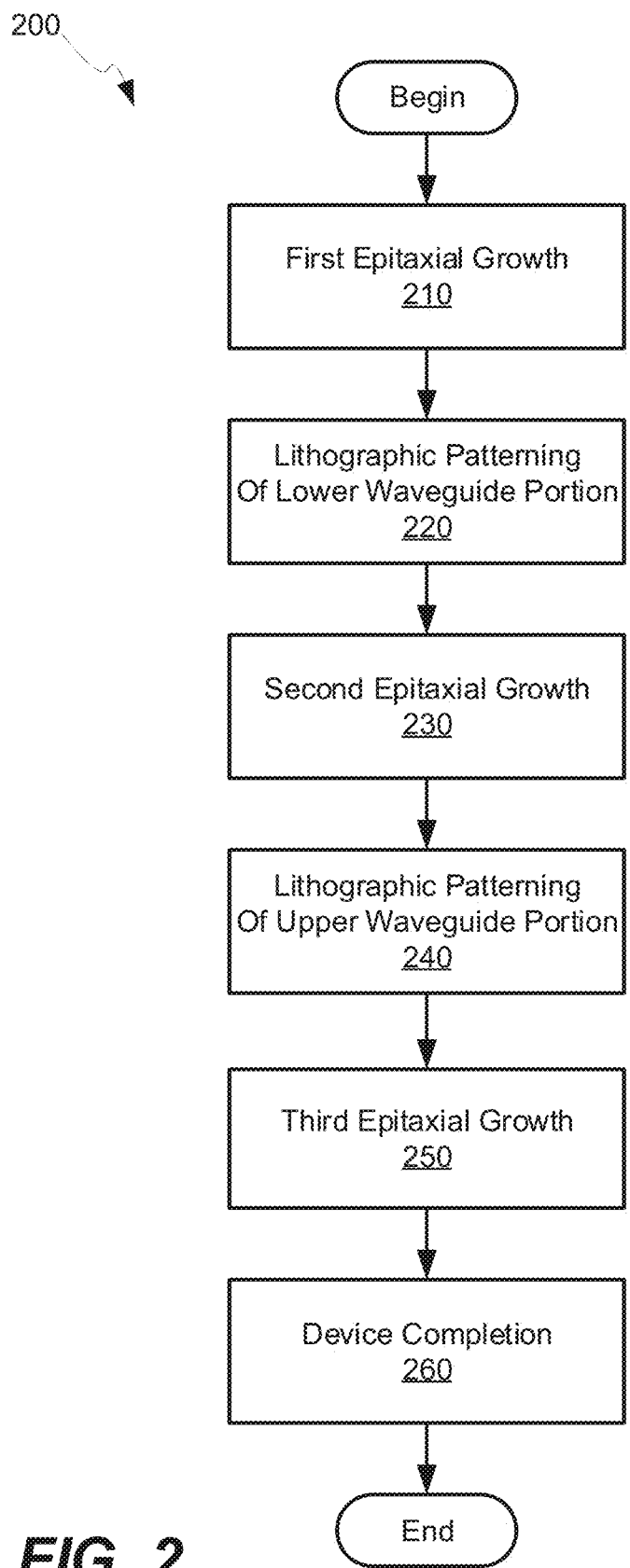
FIG. 2 depicts a flowchart of an example method of manufacturing the semiconductor device of FIG. 1.

Referring now to FIG. 2, a flowchart for an example method 200 of manufacturing the VCSEL device 100 of FIG. 1 is presented. As described in greater detail below, the method 200 of FIG. 2 in some embodiments utilities three of more epitaxial growth processes to form the various structures of the VCSEL device 100.

Figure 3A:
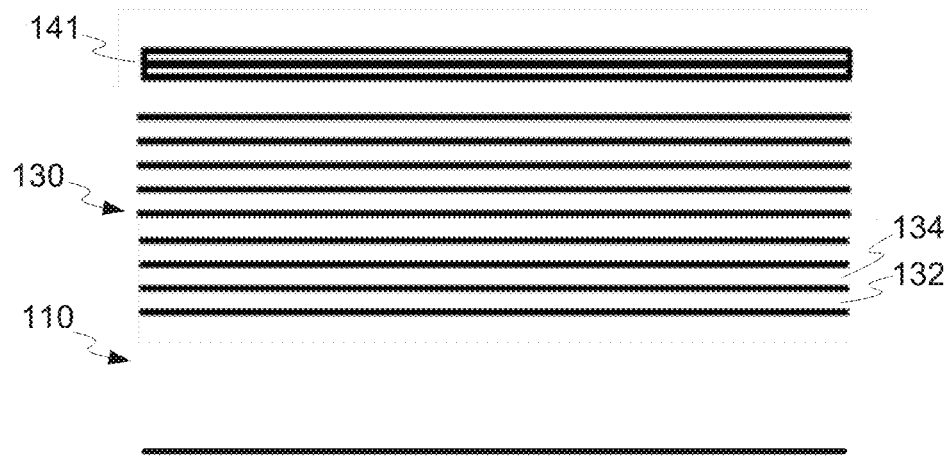
FIGS. 3A-3F depicts the semiconductor device of FIG. 1 at various stages of the manufacturing method of FIG. 2.

At 210, a first epitaxial growth process is performed. As shown in FIG. 3A, the first epitaxial growth process may grow alternating layers 132, 134 of the lower mirror 130 on a top side of a substrate 110. In various embodiments, the layers 132, 134 may define an n-DBR mirror 130 on the substrate 110. After forming the lower mirror 130, the first epitaxial growth process may further grow a waveguide lower layer 141 on the top side of the lower mirror 130. For example, a p-n layer may be grown on a top side of the lower mirror 130.

Figure 3B:
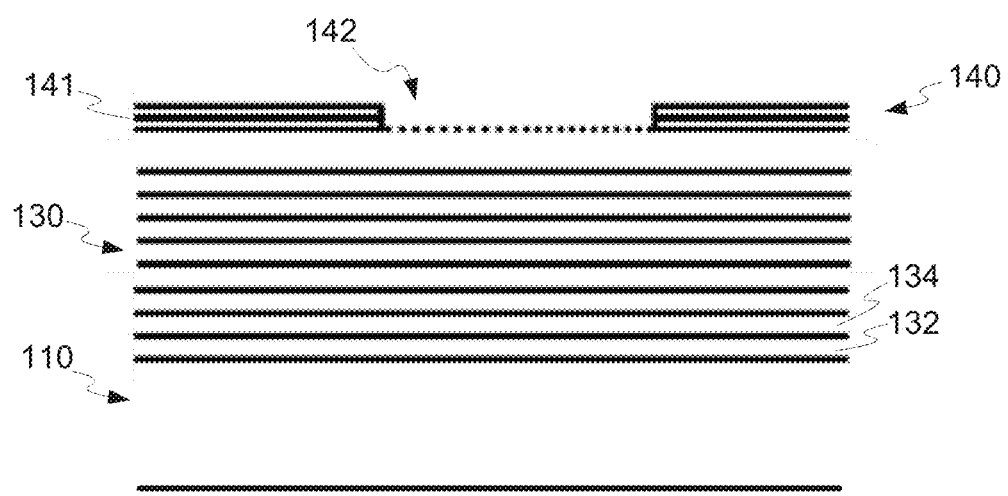

After the first epitaxial growth process, a first lithographic process at 220 may pattern the waveguide lower layer 141 and remove portions of the waveguide lower layer 141 to form the antiguided portion 140. As depicted in FIG. 3B, the lithographic process may form an aperture 142 through the waveguide lower layer 141 to obtain the antiguided portion 140. In particular, the aperture 142 may be lithographically defined and the p-layer may be etched away to define partial n-cavity through which the current is to flow.

Figure 3C:
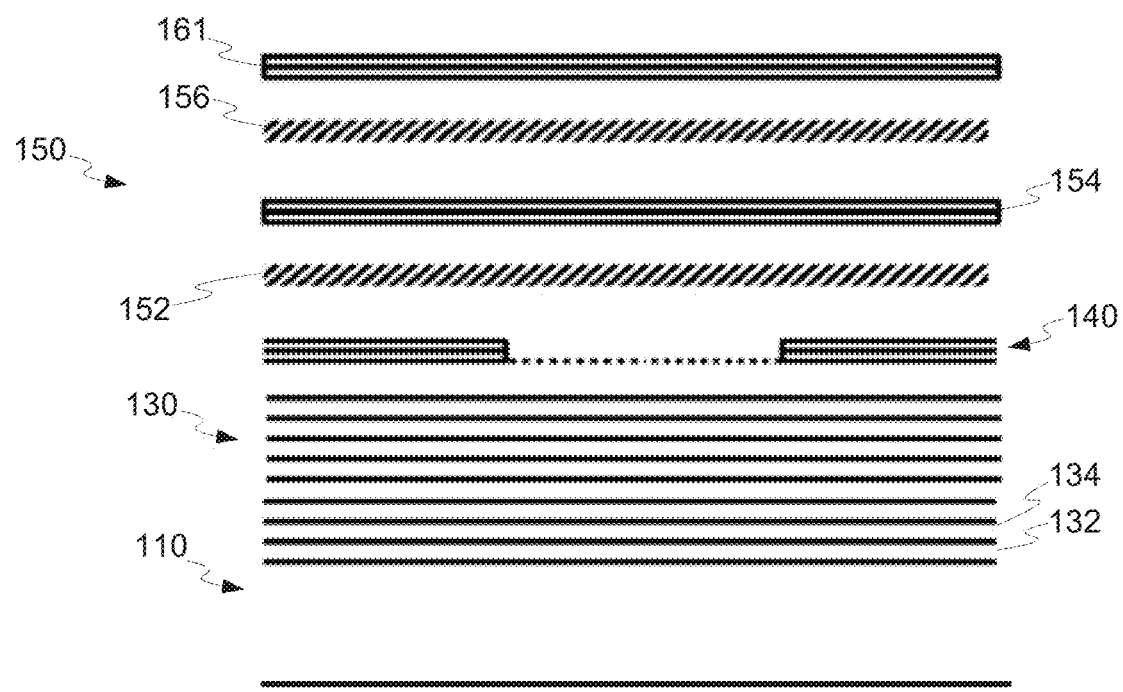

After forming the antiguided portion 140 via the first lithographic process, a second epitaxial process at 230 may grow the active region 150 and an waveguide upper layer 161 as shown in FIG. 3C. In particular, the second epitaxial process may grow the lower active layer 152 on the top side of the antiguided portion 140 such that the lower active layer 152 comprises quantum wells, quantum dots, and/or quantum dashes. The second epitaxial growth process may further grow the tunnel junction layer 154 on the top side of the lower active layer 152, and the upper active layer 156 on the top side of the tunnel junction layer 154 such that the upper active layer 156 comprises quantum wells, quantum dots, and/or quantum dashes. In embodiments having multiple active layers such as layers 152, 156, the second epitaxial process may include several cycles of growing an active layer and a tunnel junction layer, thus potentially resulting in a VCSEL emitter 125 comprising more than two active layers 152, 156. The second epitaxial process may also grow the waveguide upper layer 161 on the top side of the upper active layer 156. In some embodiments, the waveguide upper layer 161 may simply comprise the last grown tunnel junction layer in a cycle of growing an active layer and a tunnel junction layer.

Figure 3D:
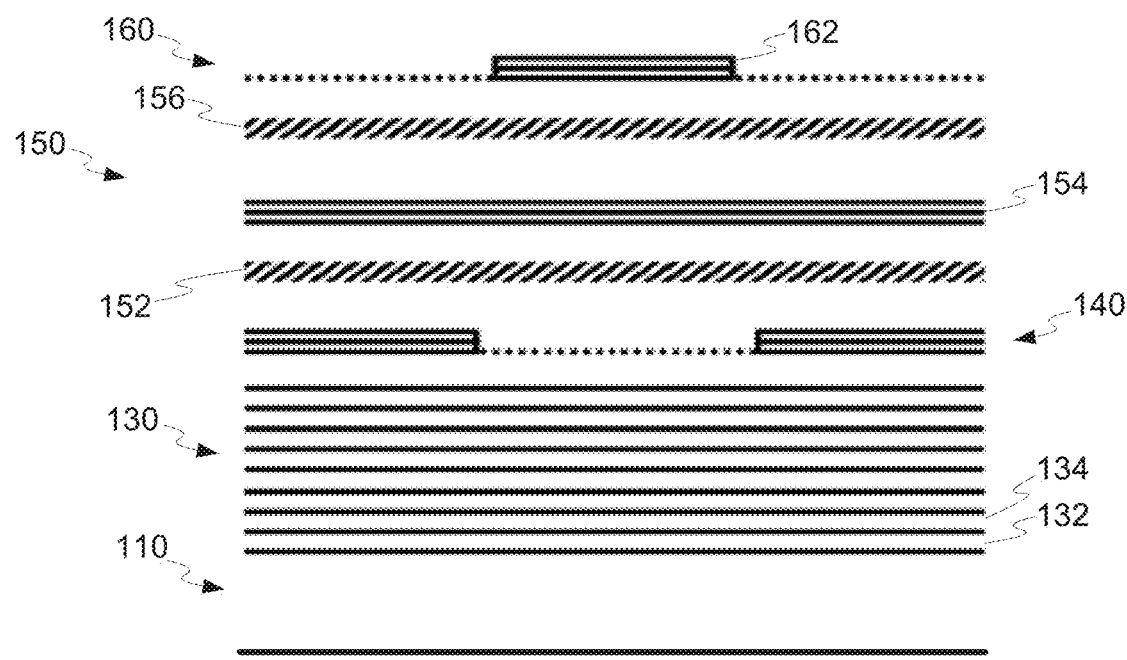

After the second epitaxial growth process, a second lithographic process at 240 may pattern the waveguide upper layer 161 and remove portions of the waveguide upper layer 161 to form the guided portion 160. As depicted in FIG. 3D, the lithographic process may define an inner area or aperture 162 and remove the areas or portions outside of the defined aperture 162. In this manner, the lithographic process may define an inner area or aperture 162 through which the current is to flow and complete the n cavity 196 of the VCSEL emitter 125. In various embodiments, the tunnel junction aperture 162 may be provided by a highly doped (>1019 cm−3) p n junction in reverse direction to the current. Current flows via the tunnel junction aperture. Outside of the tunnel junction the current is blocked by the p-n junction biased in a reverse direction. In such embodiments, the p n junction may be implemented with a breakdown voltage greater than 5 Volts.

Figure 3E:
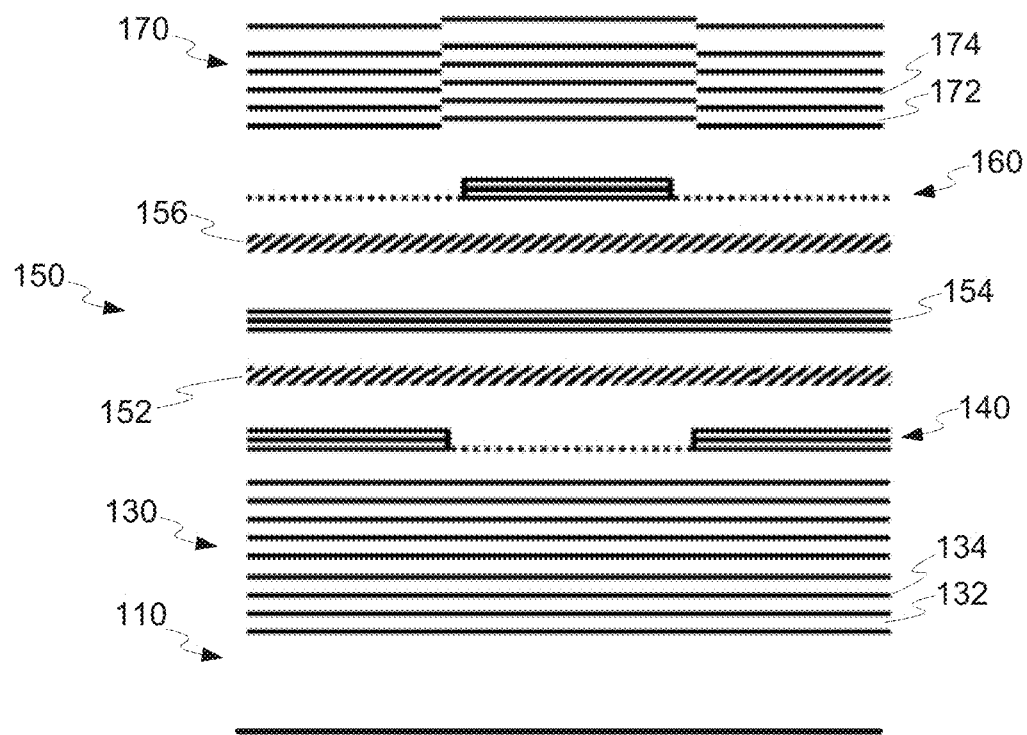

After forming the guided portion 160 via the second lithographic process, a third epitaxial process at 250 may grow the upper mirror 170. In particular, the third epitaxial process may grow alternating layers 172, 174 of the upper mirror 170 on a top side of the guided portion 160 as shown in FIG. 3E.

Figure 3F:
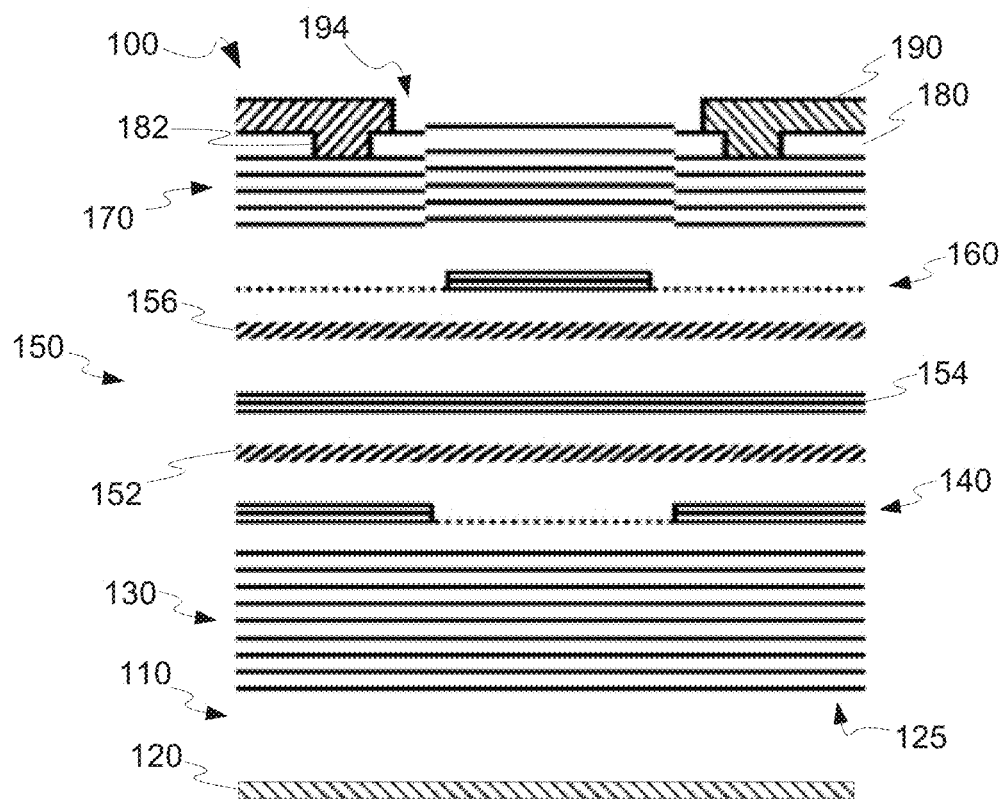

After forming the upper mirror 170, various processing steps at 260 may complete the formation of the VCSEL device 100 as shown in FIG. 3F. In particular, the lower contact layer 120 may be formed on the bottom side of the substrate 110 and the passivation layer 180 may be formed on the top side of the upper mirror 170. Openings 182 may be etched through the passivation layer 180 and the upper contact layer 190 may be formed on the top side of the passivation layer 180 such that the upper contact layer 190 extends through the openings 182 and contacts the top side of the upper mirror 170. Furthermore, as shown, the upper contact layer 190 may be formed such that aperture 194 through the upper contact layer 190 is positioned over the vertical cavity 196 of the VCSEL emitter 125.

In various embodiments, the antiguided portion 140 and the guided portion 160 define a waveguide providing both guided and antiguided elements in the same VCSEL emitter 125. The guided portion 160 has a higher effective refractive index in the inner part than the effective refractive index in the outer part. As such, light travelling through the guided portion 160 is confined to the guided portion. Conversely, the antiguided portion 140 has a lower effective refractive index in the inner part than the effective refractive index in the outer part. As such, light travelling through the antiguided portion 140 leaks from the antiguided portion 140. For example, the guided portion 160 may comprise a tunnel junction aperture providing the waveguide with a guided portion 160 that confines the current flow through the tunnel junction aperture. Moreover the antiguided portion 140 may comprise a blocking p-n layer with an aperture 142 that further confines the current flow through the aperture 142. In this manner, the VCSEL emitter 125 may confine current from above and below the active region 150 to improve efficiency. Beyond confining current, the waveguide of the VCSEL emitter 125 includes both guided and antiguided portions which aid in developing the light between the mirrors 130, 170 and/or aid in light coupling between adjacent VCSEL emitters 125.

In particular, the transverse waveguide in the VCSEL emitter 125 may be defined by the effective refractive index step. The effective refractive index step ($\Delta n$) is related to the wavelength difference ($\Delta \lambda$) inside and outside of the waveguide:

$$\frac{\Delta n}{n_0} = \frac{\Delta \lambda}{\lambda_0}$$

where $\lambda_0$ is the wavelength in the vertical cavity 196 and $n_0$ is effective refractive index in the cavity. The emission wavelength of the VCSEL emitter 125 is defined by the thickness of optical cavity: $n_0 \times d$, where d is the thickness or height of the vertical cavity 196. Thus, the thickness of the antiguided portion 140 and the guided portion 160 define the corresponding etch depth of the vertical cavity 196. As such, by controlling the thickness of the such overgrowth materials used to form the antiguided portion 140 and the guided portion 160, the VCSEL emitter 125 may be designed with a waveguide having the desired guided and antiguided properties.

Figure 4A:
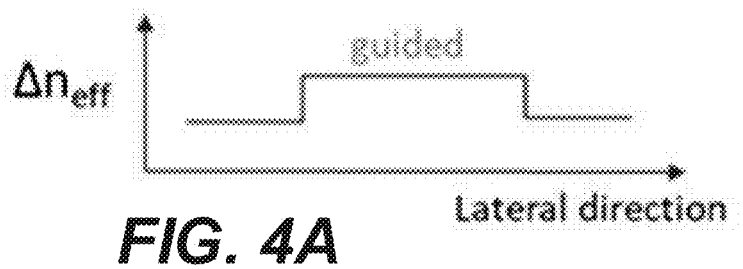
FIGS. 4A-4D depict the effective refractive index of various waveguides having guided and/or antiguided portions.
Figure 4B:
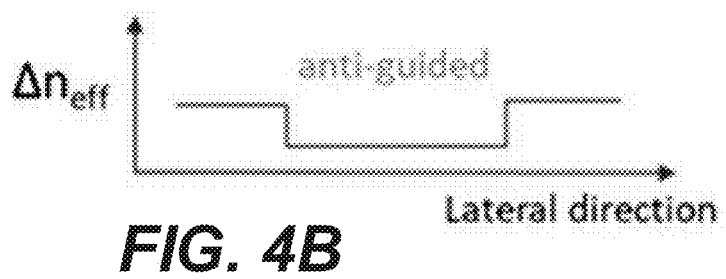
Figure 4C:
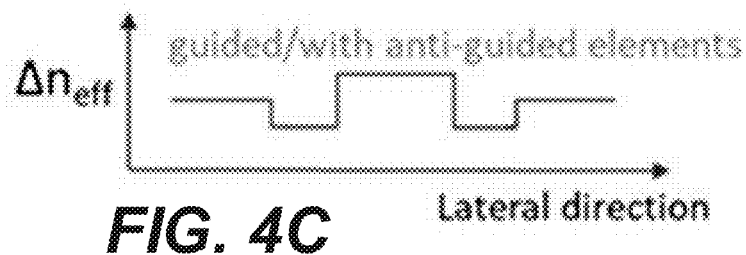
Figure 4D:
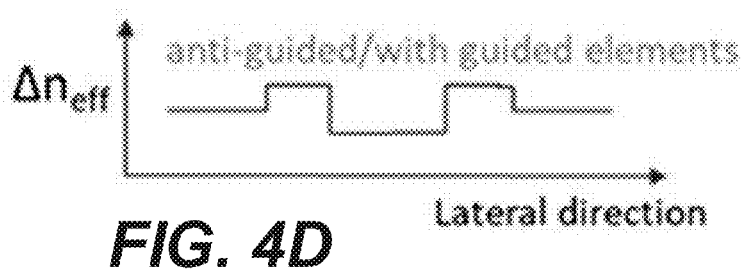

Some waveguide examples are shown in FIGS. 4A-4D. In particular, FIG. 4A depicts the effective refractive index step $\Delta n$ in the lateral direction of a waveguide comprising only the guided portion 160 (e.g., above-described tunnel junction aperture), which provides guided properties. Conversely, FIG. 4B depicts the effective refractive index step $\Delta n$ in the lateral direction of a waveguide comprising only the antiguided portion 140 (e.g., above-described p-n blocking layer), which provides antiguided properties. FIGS. 4C and 4D depict the effective refractive index step $\Delta n$ in the lateral direction of more complex waveguides that include both the guided portion 160 providing guiding properties and the antiguided portion 140 providing antiguiding properties. In particular, the waveguides of FIGS. 4C and 4D comprise tunnel junctions apertures 162 and/or p-n blocking layer apertures 142 that differ in thickness and/or lateral dimension (e.g., diameter, width, etc.). More specifically, FIG. 4C depicts a waveguide in which the aperture 162 of the guided portion 160 is aligned (e.g., coaxially aligned) with the aperture 142 of the antiguided portion 140 and the aperture 162 has a smaller diameter than the aperture 142. Conversely, FIG. 4D depicts a waveguide in which the aperture 162 of the guided portion 160 is aligned (e.g., coaxially aligned) with the aperture 142 of the antiguided portion 140 and the aperture 162 has a larger diameter than the aperture 142.

Using a waveguide comprising both a guided portion 160 with guided properties and an antiguided portion 140 with antiguided properties provides the VCSEL emitter 125 with added flexibility of mode selection. The above guided portion 160 and antiguided portion 140 both restrict current flow to respective apertures 142, 162. However, in various embodiments of the VCSEL emitter 125, current restriction from both sides of the active region 150 may be unnecessary. In such embodiments, restricting current via guided portion 160 or the antiguided portion 140 may provide sufficient. As such, the other layer may simply change the thickness of the vertical cavity 196 to guide or antiguide the light without further restricting the current flow.

Figure 5:
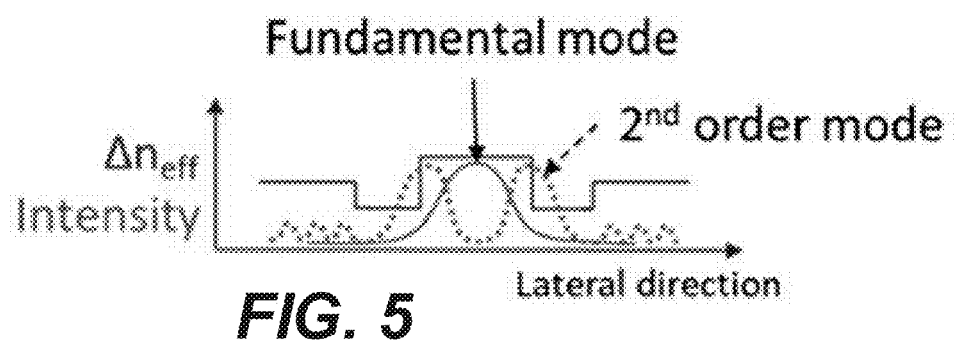
FIG. 5 depicts mode filtering aspects of an embodiment of a waveguide with guided and antiguided portions.

As shown in FIG. 5, the guided properties of the guided portion 160 and the antiguided properties of the antiguided portion 140 may combine to provide a mode filter element. For example, the guided portion 160 may comprises a tunnel junction aperture 162 that provides an effective refractive index in the lateral direction $\Delta n_{eff}$ that is larger than an effective refractive index in the lateral direction $\Delta n_{eff}$ provided by a p-n blocking layer and its aperture 142 of the antiguided portion 140. In particular, the guided portion 160 may be designed to guide and confine the fundamental mode of the light emitted by the active region 150. At the same time, the antiguided portion 140 may be designed such that the $2^{nd}$ order mode of the light emitted by the active region 150 extends outside of the optical waveguide provided by the guided portion 160 and overlaps with antiguiding area of the antiguided portion 140. Due to such antiguiding areas, the $2^{nd}$ order mode of light will leak resulting in high optical loss. Without such antiguiding area, the $2^{nd}$ order mode will also be confined, though with higher optical loss. However, at certain current values this mode will overcome the loss and start lasing, resulting in a kink in the LI curve. As such, the antiguided portion 140 and guided portion 160 may combine to improve the optical power in a single mode VCSEL emitter.

In addition to and/or alternatively to mode selection, a waveguide having both guided properties and the antiguided properties may be used to promote phase coupling between adjacent VCSEL emitters 125 of a VCSEL device. In particular, waveguides with antiguided properties between adjacent VCSEL emitters 125 may promote coherent coupling. Thus, the use of antiguided properties may provide another degree of freedom in designing coherent VCSEL arrays, which may be helpful in creating desired/specific far-field patterns.

Figure 6:
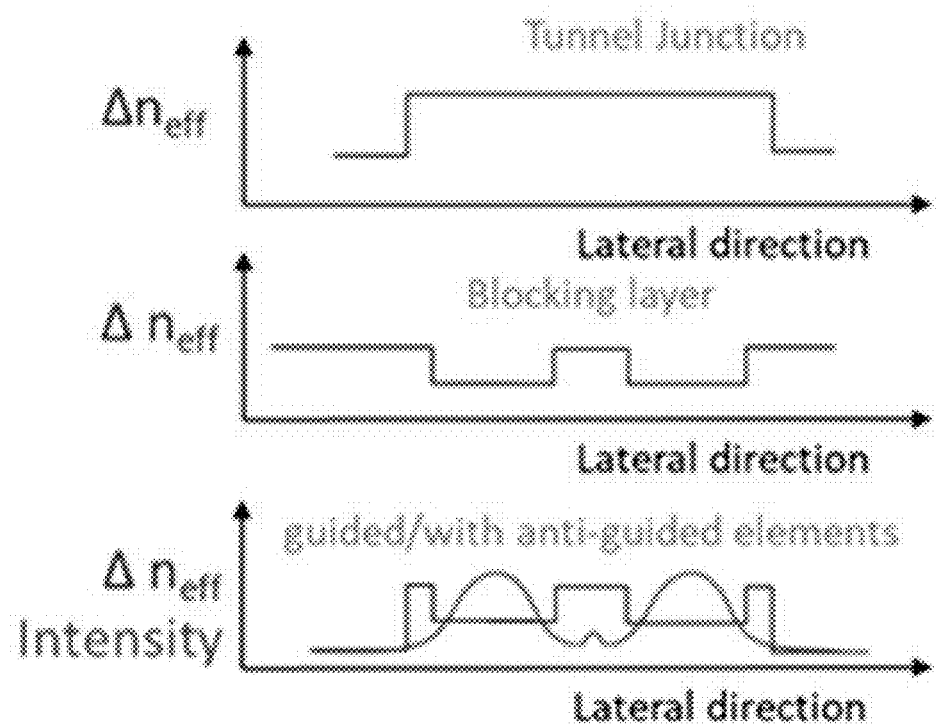
FIG. 6 depict the effective refractive index of waveguides for a VCSEL device having two coherently coupled VCSEL emitters.
Figure 7:
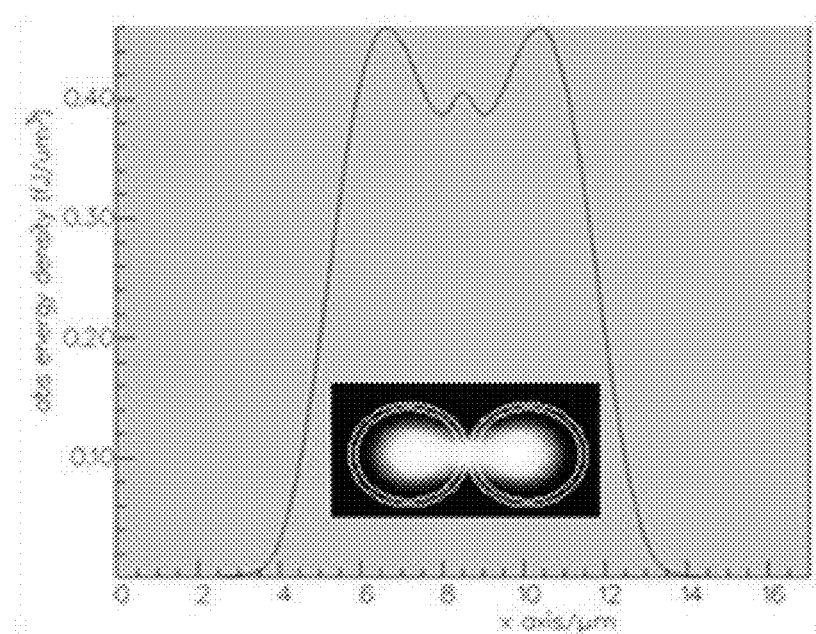
FIG. 7 depicts a corresponding optical mode intensity profile for the coherently coupled VCSEL emitters of FIG. 6.

In this regard, FIG. 6 depicts an effective refractive index profile $\Delta n_{eff}$ of a suitable waveguide for coherently coupling adjacent VCSEL emitters 125 of a VCSEL device. Moreover, FIG. 7 depicts a corresponding optical mode intensity profile for the coherently coupled VCSEL emitters 125 with circular apertures. To this end, the adjacent VCSEL emitters 125 may be built with a waveguide comprising a guided portion 160 having a tunnel junction aperture 162 and an antiguided portion 140 having a p-n blocking layer with aperture 142, which combine to provide the desired effective refractive index profile $\Delta n_{eff}$. In particular, the tunnel junction aperture 162 may be configured to provide a larger effective refractive index step than the effective refractive index step provided by the p-n blocking layer aperture 142. In this manner, the guided portion 160 may guide and provide overall confinement of the optical modes in the two VCSEL emitters 125. Moreover, the antiguided portion 140 may antiguide the optical modes and control a coupling coefficient between adjacent VCSEL emitters 125. In such embodiments, the antiguided portion 140 may be used to design either in-phase or out-of-phase arrays of coupled VCSEL emitters 125.

While the example of FIGS. 6 and 7 depict two coupled VCSEL emitters 125 of a VCSEL device 100, the number of coupled VCSEL emitters 125 is not limited to two. For example, the coupled array of VCSEL emitters 125 may include one-dimensional arrays comprising various quantities of VCSEL emitters 125 (e.g., 1×2, 1×3, 1×4, etc.). Further, a coupled array of VCSEL emitters 125 may include two-dimensional arrays comprising various quantities of VCSEL emitters 125 (e.g., 2×2, 2×4, 4×4, etc.). Moreover, the waveguide properties may vary the phase and coupling strengths between neighboring VCSEL emitters 125 of the array, which may provide further degrees of freedom for designing far-field patterns. Additionally or alternatively to the regular 1D or 2D arrays described above, the VCSEL device 100 may include coupled arrays of VCSEL emitters 125 that are arranged as irregular 1D or 2D arrays in which distances, phase coupling conditions, and/or coupling strengths vary between VCSEL emitters 125.

Figure 8:
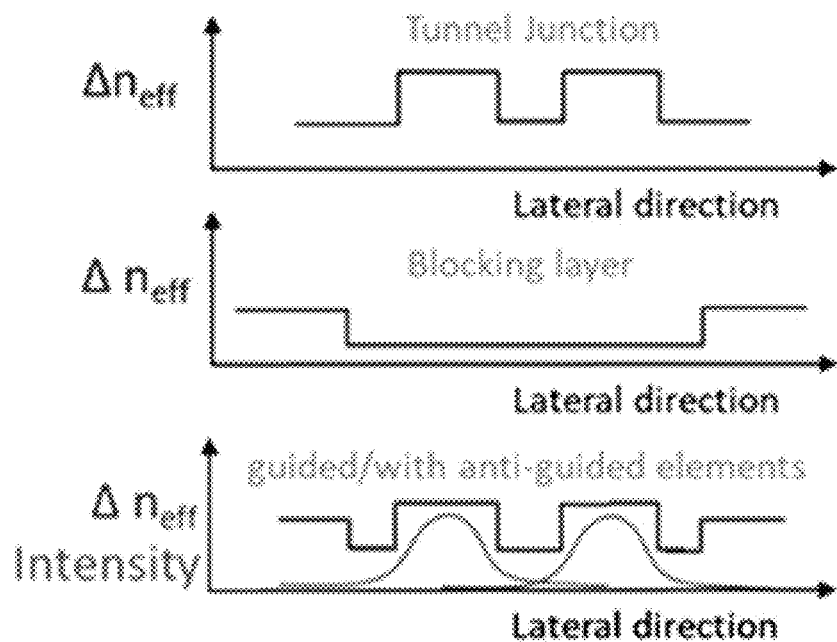
FIGS. 8 and 9 depicts aspects of a VCSEL device having two coherently coupled VCSEL emitters and their respective effective refractive index Δneff provided by guided portions and antiguided portions of such VCSEL emitters.
Figure 9:
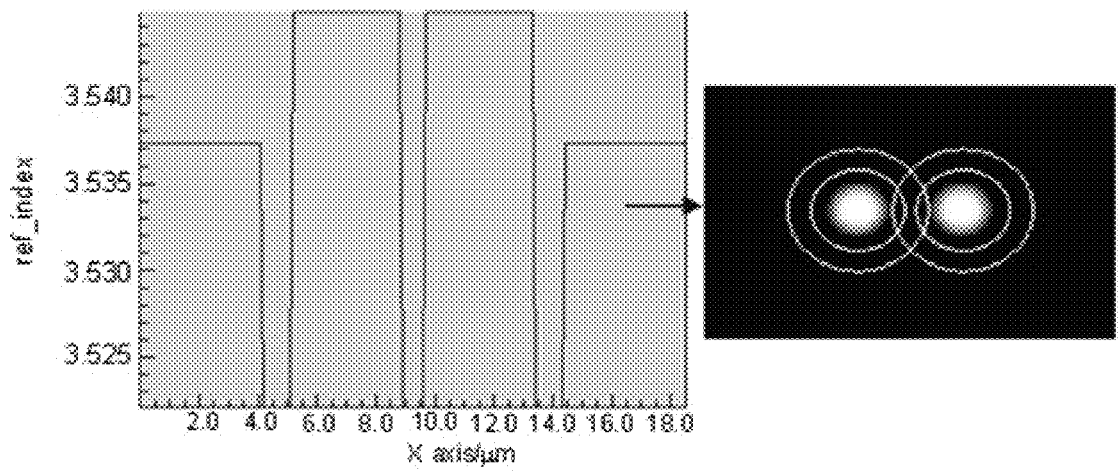

In addition to and/or alternatively to the above-discussed coupling, antiguided properties of the antiguided portion 140 may be used as a VCSEL array mode filter. To this end, FIGS. 8 and 9 depicts aspects of two VCSEL emitters 125 that are coherently coupled. As shown in FIG. 8, the effective refractive index $\Delta n_{eff}$ provided by the tunnel junction aperture 162 of the guided portion 160 may be larger compared to the effective refractive index $\Delta n_{eff}$ of the p-n blocking layer aperture 142 of the antiguided portion 140. The mode selection provided by the waveguide portions 140, 160 of FIG. 8 works in a similar way to the mode selection described above with regard to FIG. 5. Namely, the waveguide portions 140, 160 associated with FIG. 8 cooperate to introduce high loss for higher order modes. Such a configuration of the waveguide portions 140, 160 may be used to design high single mode power coherently coupled arrays of VCSEL emitters 125. In particular, the left side of FIG. 9 depicts the effective refractive index profile of the waveguide portions 140, 160 for two coherently coupled VCSEL emitters 125. The right side of FIG. 9 depicts the resulting mode intensity of the coupled VCSEL emitters 125 due to the guided and antiguided properties provided by the guided portion 160 and the antiguided portion 140. Only zero order mode is confined.

The above embodiments generally utilize a tunnel junction aperture 162 for the guided portion 160 that provides the positive effective refractive index $\Delta n_{eff}$ step for optical mode confinement/guiding. However, a p-n blocking layer with aperture similar to aperture 142 may also be used. In such an embodiment, the VCSEL emitter 125 may include two p-n blocking layer aperture with one above and one below the active region 150.

Moreover, in the above embodiments, either the retained or removed materials the apertures 142, 162 may be generally circular. However, in other embodiments, the waveguide portions 140, 160 may include a different number of apertures (e.g., 0, 1, 2, 3, etc.) and/or apertures of different shapes (e.g., oval, square, rectangular, annular, etc.) in order to define appropriate waveguides and/or current confinement structures. Furthermore, while the above embodiments of the VCSEL device 100 include VCSEL emitters 125 with a single guided portion 160 above the active region 150, other embodiments may include one or more antiguided portions and/or one more guided portions above the active region 150. Similarly, while the above embodiments of the VCSEL device 100 include VCSEL emitters 125 with a single antiguided portion 140 below the active region 150, other embodiments may include one or more antiguided portions and/or one more guided portions below the active region 150.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A semiconductor device, comprising:
an upper mirror;
a lower mirror; and
an active region and vertical cavity between the upper mirror and the lower mirror;
wherein the vertical cavity defines a waveguide comprising a guided portion and an antiguided portion between the upper mirror and the lower mirror;
wherein the guided portion comprises a tunnel junction aperture; and
wherein the antiguided portion comprises a p-n blocking layer aperture.

2. The semiconductor device of claim 1, wherein:
the upper mirror comprises a distributed Bragg reflector; and
the lower mirror comprises a distributed Bragg reflector.

3. The semiconductor device of claim 1, wherein:
the active region comprises a plurality of active layers; and
each active layer comprises quantum wells, quantum dots, and/or quantum dashes.

4. The semiconductor device of claim 3, wherein the active region comprises a tunnel junction layer between adjacent active layers of the plurality of active layers.

5. The semiconductor device of claim 1, wherein the tunnel junction aperture has a greater lateral dimension than the p-n blocking layer.

6. The semiconductor device of claim 1, wherein the tunnel junction aperture has a smaller lateral dimension than the p-n blocking layer.

7. A semiconductor device, comprising:
an array of VCSEL emitters;
wherein each VCSEL emitter of the array of VCSEL emitters comprises:
an upper mirror;
a lower mirror; and
an active region and vertical cavity between the upper mirror and the lower mirror; and
wherein the vertical cavity defines a waveguide comprising a guided portion between the active region and the upper mirror and an antiguided portion between the active region and the lower mirror;
wherein the guided portion of each VCSEL emitter comprises a tunnel junction aperture; and
wherein the antiguided portion of each VCSEL emitter comprises a p-n blocking layer aperture.

8. The semiconductor device of claim 7, wherein:
the upper mirror of each VCSEL emitter comprises a distributed Bragg reflector;
the lower mirror of each VCSEL emitter comprises a distributed Bragg reflector;
the active region of each VCSEL emitter comprises a plurality of active layers; and
each active layer comprises quantum wells, quantum dots, and/or quantum dashes.

9. The semiconductor device of claim 7, wherein the antiguided portion of a first VCSEL emitter and the antiguided portion of a second VCSEL emitter adjacent to the first VCSEL emitter coherently couple the first VCSEL emitter to the second VCSEL emitter.

10. The semiconductor device of claim 7, wherein the antiguided portion of a first VCSEL emitter and the antiguided portion of a second VCSEL emitter adjacent to the first VCSEL emitter phase couple the first VCSEL emitter to the second VCSEL emitter.

11. The semiconductor device of claim 7, wherein:
the tunnel junction aperture of each VCSEL emitter comprises a p-n junction in reverse direction to current flow; and
the p-n junction of each VCSEL emitter has a breakdown voltage greater than 5 Volts.

12. The semiconductor device of claim 7, wherein the tunnel junction aperture of each VCSEL emitter has a smaller lateral dimension than the p-n blocking layer for the respective VCSEL emitter.

13. The semiconductor device of claim 7, wherein the tunnel junction aperture of each VCSEL emitter has a greater lateral dimension than the p-n blocking layer for the respective VCSEL emitter.

14. A method of forming a semiconductor device, the method comprising:
growing, via a first epitaxial process, a lower mirror on a top side of a substrate;
growing, via the first epitaxial process, a p-n blocking layer on a top side of the lower mirror;
forming an antiguided portion of a waveguide by etching, via a first lithographic process, the p-n blocking layer to form an aperture of the antiguided portion of the waveguide;
growing, via a second epitaxial process, an active region over the antiguided portion of the waveguide;
growing, via the second epitaxial process, a tunnel junction layer on a top side of the active region;
forming a guided portion of the waveguide by etching, via a second lithographic process, the tunnel junction layer to form an aperture of the guided portion of the waveguide; and
growing, via a third epitaxial process, an upper mirror over the guided portion of the waveguide.

15. The method of claim 14, wherein growing the lower mirror via the first epitaxial process comprises:
growing alternating high and low index of refraction layers to form a distributed Bragg reflector; and
growing the upper mirror via the third epitaxial process comprising growing alternating high and low index of refraction layers to form a distributed Bragg reflector.

16. The method of claim 14, wherein growing the active region via the second epitaxial process comprises:
growing a first active layer comprising quantum wells, quantum dots, and/or quantum dashes;
growing a tunnel junction layer on a top side of the first active layer; and
growing a second active layer on a top side of the tunnel junction layer, wherein the second active layer comprises quantum wells, quantum dots, and/or quantum dashes.

17. The method of claim 14, wherein forming the antiguided portion coherently couples light of the active region with light of an adjacent active region.

18. The method of claim 14, wherein forming the guided portion of the waveguide forms the aperture of the guided portion such that its lateral dimension is greater than a lateral dimension of the aperture of the antiguided portion.

* * * * *